United States Patent [19]
Williams et al.

[11] Patent Number: 5,530,837
[45] Date of Patent: Jun. 25, 1996

[54] METHODS AND APPARATUS FOR INTERLEAVING MEMORY TRANSACTIONS INTO AN ARBITRARY NUMBER OF BANKS

[75] Inventors: Jim Williams, Lowell, Mass.; Ruben Kleiman, Guadalajara, Mexico

[73] Assignee: Hewlett-Packard Co., Palo Alto, Calif.

[21] Appl. No.: 218,715

[22] Filed: Mar. 28, 1994

[51] Int. Cl.$^6$ ................................................ G06F 12/00
[52] U.S. Cl. ............... 395/434; 395/421.02; 364/DIG. 1
[58] Field of Search ................................. 395/400, 425, 395/484, 481, 475, 480, 477

[56] References Cited

U.S. PATENT DOCUMENTS

| | | | |
|---|---|---|---|
| 4,754,394 | 6/1988 | Brantly, Jr. et al. | 395/400 |
| 5,293,607 | 3/1994 | Brockmann et al. | 395/425 |
| 5,301,292 | 4/1994 | Hilton et al. | 395/425 |
| 5,341,486 | 8/1994 | Castle | 395/400 |
| 5,412,788 | 5/1995 | Collins et al. | 395/425 |

OTHER PUBLICATIONS

Cheung, Kifung C, "Design and Analysis of a Gracefully Degrading Interleaved Memory System", IEEE Trans. on Comp, V.39, No. 1 pp. 63–71, Jan. 90.
Raghavan, Ram, "On Randomly Interleaved Memories", Supercomputing '90, pp. 49–58.
"The Cydra 5 Stride–Insensitive Memory System" 1989 International Conference on Parallel Processing, pp. I–242–I–246, B. Ramakrishna Rau, Michael S. Schlansker, Eavid W. L. Yen.

Primary Examiner—Rebecca L. Rudolph

[57] ABSTRACT

Methods and apparatus are provided for interleaving memory transactions into an arbitrary number of memory banks that need not be equal size. A memory address range is divided into subranges of contiguous addresses. A first embodiment associates the subranges to a unique set of banks. Memory transactions falling within a subrange are interleaved among banks associated with the subrange. A second embodiment associates a set of banks with each subrange. The set of banks of one subrange are not necessarily independent of the set of banks of a second subrange. A third embodiment is a hybrid of the first and second embodiment. Range detection mechanisms are provided for detecting if a memory transaction falls within a subrange. In addition, an ID number is produced from the memory address according to an interleaving algorithm. The ID number is compared to bank ID numbers associated with each of the banks. If the ID matches the bank ID and the address falls within a corresponding subrange the bank is selected to receive the memory transaction. Lastly, a mechanism is provided for producing a unique bank offset from the memory address.

8 Claims, 8 Drawing Sheets

|  | | | | ID | | | | |
|---|---|---|---|---|---|---|---|---|
| SEGMENT | 0 | 1 | 2 | 3 | 4 | 5 | 6 | 7 |
| 0 | BANK-0 | BANK-1 | BANK-2 | BANK-3 | BANK-4 | BANK-5 | BANK-6 | BANK-7 |
| 1 | BANK-8 | BANK-1 | BANK-2 | BANK-3 | BANK-4 | BANK-5 | BANK-6 | BANK-7 |
| 2 | BANK-8 | BANK-9 | BANK-2 | BANK-3 | BANK-4 | BANK-5 | BANK-6 | BANK-7 |
| 3 | BANK-8 | BANK-9 | BANK-10 | BANK-3 | BANK-4 | BANK-5 | BANK-6 | BANK-7 |
| 4 | BANK-8 | BANK-9 | BANK-10 | BANK-11 | BANK-4 | BANK-5 | BANK-6 | BANK-7 |
| 5 | BANK-8 | BANK-9 | BANK-10 | BANK-11 | BANK-12 | BANK-5 | BANK-6 | BANK-7 |
| 6 | BANK-8 | BANK-9 | BANK-10 | BANK-11 | BANK-12 | BANK-0 | BANK-6 | BANK-7 |
| 7 | BANK-8 | BANK-9 | BANK-10 | BANK-11 | BANK-12 | BANK-0 | BANK-1 | BANK-7 |
| 8 | BANK-8 | BANK-9 | BANK-10 | BANK-11 | BANK-12 | BANK-0 | BANK-1 | BANK-2 |
| 9 | BANK-3 | BANK-9 | BANK-10 | BANK-11 | BANK-12 | BANK-0 | BANK-1 | BANK-2 |
| 10 | BANK-3 | BANK-4 | BANK-10 | BANK-11 | BANK-12 | BANK-0 | BANK-1 | BANK-2 |
| 11 | BANK-3 | BANK-4 | BANK-5 | BANK-11 | BANK-12 | BANK-0 | BANK-1 | BANK-2 |
| 12 | BANK-3 | BANK-4 | BANK-5 | BANK-6 | BANK-12 | BANK-0 | BANK-1 | BANK-2 |

| SEGMENT NUMBER | SELECTED BITS OF SEGMENT NUMBER | RANGE | REPLACEMENT BITS |
|---|---|---|---|
| 0 | 0 | primary | 0 |
| 1 | 1 | primary | 1 |
| 2 | 2 | no | --- |
| 3 | 3 | no | --- |
| 4 | 4 | no | --- |
| 5 | 5 | no | --- |
| 6 | 6 | no | --- |
| 7 | 7 | secondary | 7+3=2 (truncated to 3 bits) |
| 8 | 0 | secondary | 0+3=3 |
| 9 | 1 | secondary | 1+3=4 |
| 10 | 2 | secondary | 2+3=5 |
| 11 | 3 | secondary | 3+3=6 |
| 12 | 4 | secondary | 4+3=7 |

METHODS AND APPARATUS FOR INTERLEAVING MEMORY TRANSACTIONS INTO AN ARBITRARY NUMBER OF BANKS

BACKGROUND OF THE INVENTION

1. Field of the Invention

The present invention relates generally to methods and apparatus for memory interleaving. More particularly, the invention relates to methods and apparatus for interleaving memory transactions into an arbitrary number of memory banks and to an interleaved memory system that need not have equal size memory banks.

2. Discussion of the Related Art

The history of computing technology has been one of an ever increasing appetite for memory. Though the unit cost of memory is decreasing, memory system cost is not. This is so primarily because systems need increasing amounts of memory.

Memory is typically a performance bottleneck in a computing system. Complicating this matter, memory may hold both programs and data. Each has unique characteristics pertinent to memory performance. For example, when a program is being executed, memory traffic is typically characterized as a series of sequential reads. On the other hand, when a data structure is being accessed, memory traffic is usually characterized by a stride, i.e., the difference in address from a previous access. A stride may be random or fixed. For example, repeatedly accessing a data element in an array may result in a fixed stride of two.

Figure 1A:
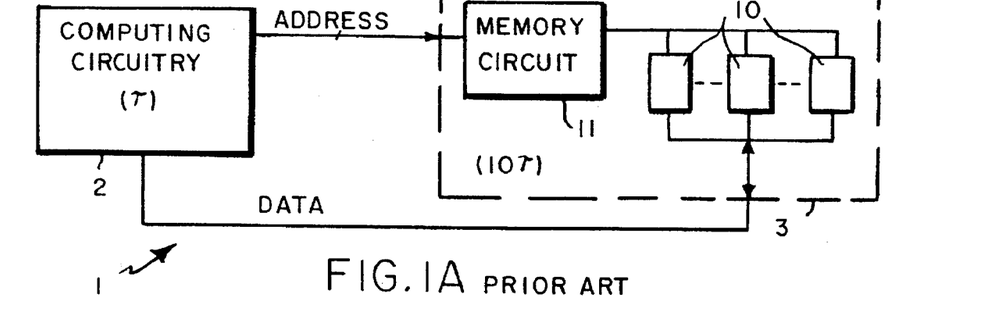
FIGS. 1A–1C illustrate architectural concepts of the prior art.

FIG. 1A illustrates a crude memory architecture 1 provided for descriptive purposes only. Memory chips 10 are arranged into an independently controllable array 30 ("a memory bank"). Under the control of a memory control circuit 11, a bank can operate on one transaction at a time. The memory chips may be of dynamic storage technology ("DRAMS"), or of static ram technology. DRAM technology is usually slower than computing circuitry and the like. Static RAM technology, on the other hand, is much faster than DRAMs, but is also more costly and, as such, is usually used more judiciously.

A hypothetical operational speed relationship among the devices is illustrated by using a unit time delay $\tau$. In particular, the computing circuitry 20 has a time delay of $\tau$ and, consequently, may operate at a frequency of $1/\tau$. The memory bank 30, on the other hand, has a time delay of $10\tau$ and, at best, may operate at a frequency of $1/10\tau$. The effective speed of the system will be something between $1/\tau$ and $1/10\tau$ and will depend upon how often memory 30 is accessed. Because, in reality, memory 30 will be accessed nearly every cycle, the effective speed of the system will likely approximate $1/10\tau$.

Figure 1B:
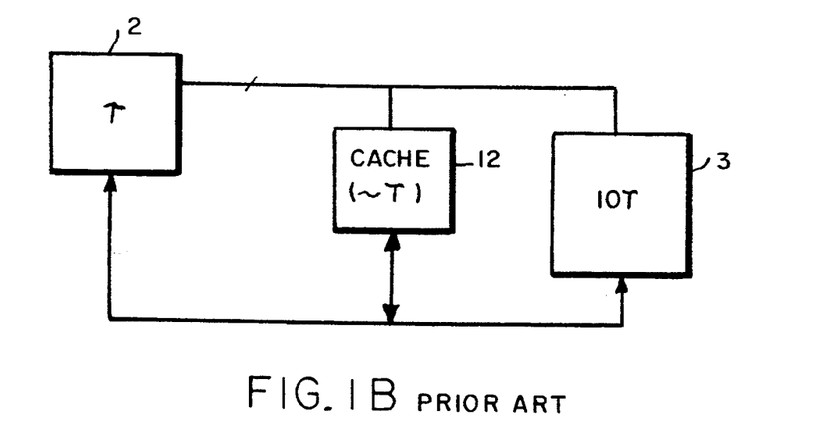
Figure 1C:
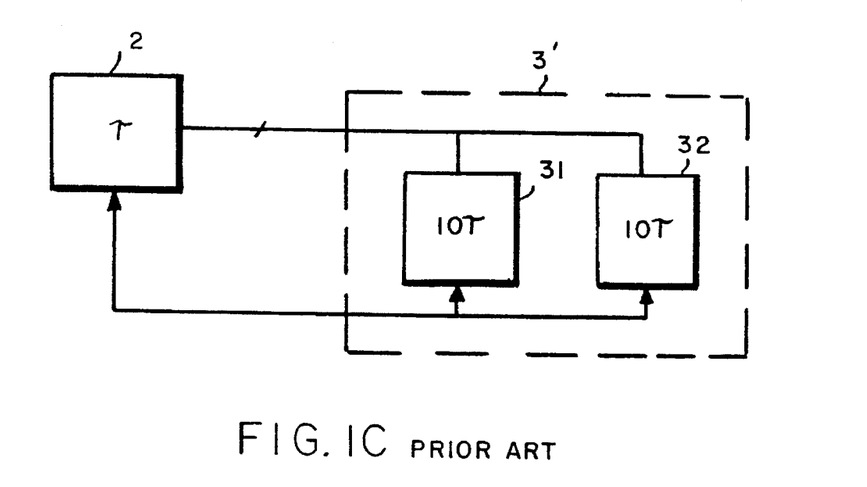

To address the performance gap between memory and the computing circuitry, caches of memory data have been used, see FIG. 1B. A cache 12 holds a subset of the memory items stored by memory 30. A cache 12 is typically smaller than the size of memory 30 and is typically constructed with faster technology, such as static rams. A cache is characterized by a "hit rate," which indicates how successful the cache is at holding the memory items that are actually needed by the system: the higher the hit rate, the higher the effective speed of the system. Though many cache design features affect the hit rate, it is generally recognized that a larger cache size produces a higher hit rate. Cache memories are well known and will not be described in detail. To improve the memory system bandwidth, interleaving of memory banks has been used. FIG. 1C illustrates a two-way interleaved memory system having two equal size banks 31 and 32. (Four-way interleaving would have four equal size banks, etc.) The computing circuitry 20 may request a memory item from bank 31 at absolute time $\tau$ and, then before bank 31 provides the item, request another item from bank 32 at time $2\tau$. Bank 31 returns the item at absolute time $11\tau$, i.e., $10\tau$ after it received the request, and bank 32 returns the other item at absolute time $12\tau$. Consequently, the resulting memory performance is effectively doubled, because two items, rather than just one, have been returned in a time of $10\tau$.

So-called "low-order" interleaving uses the least significant memory address bits to select a memory bank. For example, in two-way, low-order interleaving the least significant bit is used to select a bank. The more significant memory address bits are then used as an offset within the selected bank. Alternatively, so-called "high-order" interleaving uses the most significant memory address bits to select a bank and uses the less significant bits as an offset within the selected bank. The type of interleaving, e.g., "low-order", is often returned to as "the interleaving algorithm."

U.S. Pat. No. 5,293,607, entitled "Flexible N-Way Interleaving," describes an example of an interleaved memory system.

Although systems often need more memory, the prior art places substantial limitations on the ability to upgrade the memory size or the interleaving organization. This is true for both DRAM memory systems and static ram systems, such as caches. To add memory banks, most prior art systems require that the number of banks be increased to the next highest power of 2. This may be inconvenient, especially when larger jumps are necessitated, such as from eight-way to sixteen-way. Moreover, the prior art requires the banks to be of equal size. This may force a system user to use memory technology that does not have an optimum cost-performance. This is especially true, when considering that memory technology changes frequently. These limitations are especially significant because system users often have a substantial investment in the memory system. As such, users do not want to discard their existing investment. They would much rather have the ability to keep their existing memory investment, yet be able to upgrade with new technology.

Accordingly, there is a need in the art for a flexible interleaving system to select and address an arbitrary number of memory banks.

SUMMARY OF THE INVENTION

These and other objects are solved with a method of an apparatus for interleaving among an arbitrary number of memory banks. According to the invention, an interleaving method is provided for interleaving memory transactions into an arbitrary number of memory banks. This method may include the following steps: associating a memory address range to a plurality of groups such that each group has an independent group address range; associating the arbitrary number of memory banks with the plurality of groups such that each group has a set of unique memory banks and each of the banks has a bank ID; detecting whether a memory address of the memory transaction falls within one of the plurality of group address ranges; processing the memory address of the memory transaction according to an interleaving algorithm to provide an ID number;

detecting if the ID number matches the bank ID of any bank; selecting a bank to receive the memory transaction on the basis of those banks that detect the memory address as falling within their associated group address range and on the basis of those banks that detect the ID number as matching their associated bank IDs; and forming an offset into the memory bank detected above from the memory address of the memory transaction.

In this regard, a logic circuit is provided in each bank to select the bank to receive the transaction. This circuit includes a range detection mechanism for comparing a memory address of a memory transaction with an upper range address and a lower range address, the upper range address and the lower range address defining a group address range; an ID mechanism for producing an ID number from the memory address, according to an interleaving algorithm; a bank ID comparison mechanism for comparing the ID number with a bank ID for the memory bank; and a mechanism for selecting the bank to receive the memory transaction in response to the range detect, ion mechanism determining that the memory address falls within the group address range and the bank ID comparison mechanism determining that the ID number matches the bank ID.

A second embodiment of the invention provides a method, which may have the following steps: partitioning a memory address range into a plurality of segments, each segment having a segment address range of contiguous addresses; associating each memory bank of the arbitrary number of memory banks with a primary address range and a secondary address range, the primary and secondary address ranges being contiguous; associating each bank with a primary bank ID corresponding to the primary address range; associating each bank with a secondary bank ID, corresponding to the secondary address range; detecting whether a memory address of the memory transaction falls within the primary address range; detecting whether the memory address of the memory transaction falls within the secondary address range; processing the memory address of the memory transaction to produce an ID number; detecting if the ID number matches the primary bank ID; detecting if the ID number matches the secondary bank ID; selecting the bank to receive the memory transaction if the memory address falls within the primary address range and the ID number matches the primary bank ID; selecting a memory bank to receive the memory transaction if the memory address falls within the secondary address range and the ID number matches the secondary bank ID; producing a unique bank offset for the selected bank from the memory address.

In this regard, a logic circuit is provided for each bank, which may include a range detection mechanism for comparing a memory address of a memory transaction with a first upper range address and a first lower range address and for comparing the memory address with a second upper range address and a second lower range address; the first upper range address and first lower range address defining a primary address range, and the second upper range address and second lower range address defining a secondary address range; an ID mechanism for producing an ID number from the memory address, according to an interleaving algorithm; a bank ID comparison mechanism for comparing the ID number with a first bank ID of the memory bank and with a second bank ID of the memory bank; a first mechanism for selecting a memory bank to receive the memory transaction in response to the range detection mechanism determining that the memory address falls within the primary address range and the bank ID comparison mechanism determining that the first bank ID matches the ID number; and determining that the second ID matches the ID number.

The ID mechanism provides IDs according to an interleaving algorithm. The algorithms may include low or high-order interleaving, pseudo-random, or a pseudo-random like interleaving called "residue" interleaving.

The circuitry for providing this may be placed on each bank or it may be shared by several banks belonging to a group or segment.

DETAILED DESCRIPTION OF THE DRAWING

The invention relates to a method and apparatus for interleaving memory transactions into a set of memory banks. The set may have an arbitrary number of memory banks, and the banks need not be of equal size. To interleave memory transactions, a bank is selected from among the set of banks and an offset into that bank is formed. The invention organizes memory, i.e., memory address space, according to address subranges and then associates the banks with particular subranges. The invention particularly relates to bank selection and offset formation. Memory banks also need timing control so that the offset may be provided in a correct form at a correct time in conjunction with the appropriate control signals. This timing control depends on the chip technology used. For example, DRAMS have timing control requirements for a row address strobe ("RAS") and a column address strobe ("CAS"). As the invention may be used with different technologies, and as timing control techniques are known and can be straightforwardly implemented given specifications of a technology, such timing control will not be described, except where it is material to the discussion of the invention.

Though the size of a memory system is often specified in bytes, a physical implementation may access memory in block transactions. Each block has a certain number of bytes, such as 32. Consequently, when addresses are discussed herein it will be understood that the address refers to a block address and that a block may be of any size.

1. First Embodiment

Figure 2:
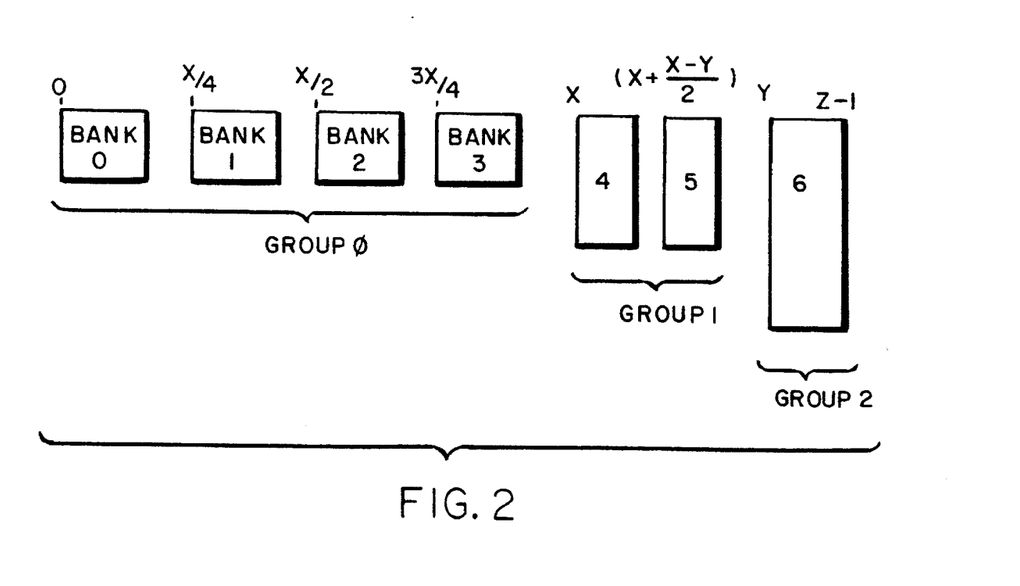
FIG. 2 is an example of a memory organization according to a first embodiment of the invention.

In first embodiment of the invention, the memory address space is partitioned into a number of groups. Each group maps into a unique address range ("group address range") and has a plurality of physical memory banks associated with it. Though each bank of a group must be the same size, banks of a first group need not be the same size as banks of a second group. FIG. 2 illustrates an example of such a memory organization. The physical banks are numbered 0–6, and the starting address for a given bank is indicated at the upper left corner of the bank. Group 0 is associated with physical banks 0–3 and address range 0 to (X–1); group 1 is associated with banks 4–5 and address range X to (Y–1); and group 2 is associated with bank 6 and address range Y to (Z–1).

A. Bank Selection of First Embodiment

Figure 2A:
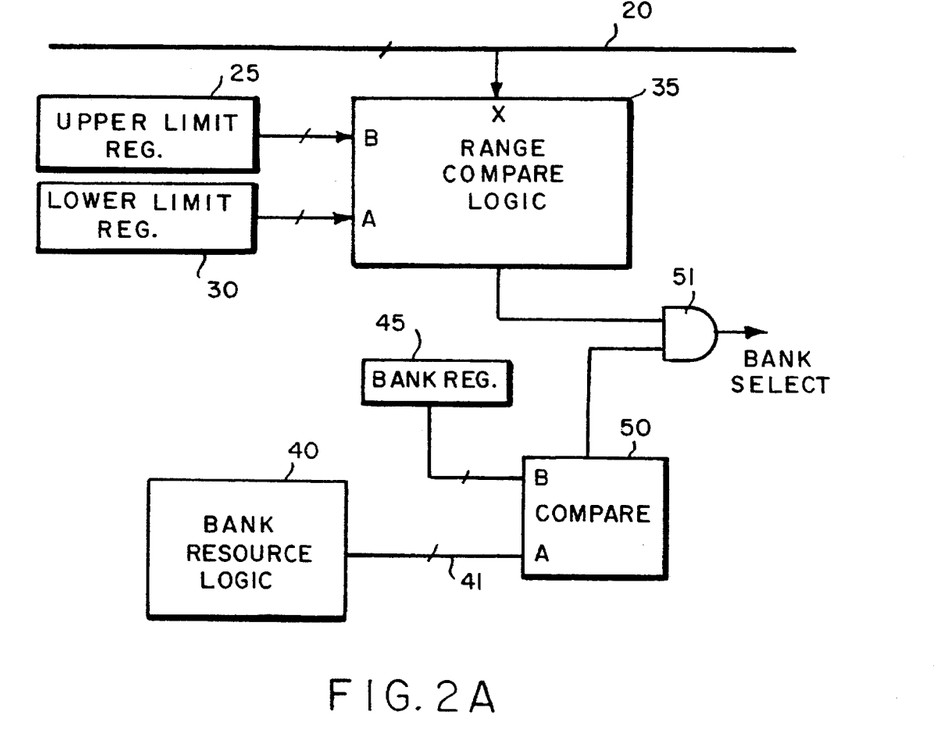
FIG. 2A is a logic diagram of a circuit for the first embodiment.

FIG. 2A illustrates an implementation of the bank selection logic. This logic resides in a memory control circuit of each bank. Bus 20 provides a block address. Those skilled in the art will appreciate that the invention is not limited to any particular bus structure. That is, bus 20 may be dedicated to providing addresses only to memory, to providing addresses and data to memory, or it may be bidirectional, carrying addresses and data to and from memory.

Range comparison logic 35 receives an address from the bus 20 and receives inputs from upper limit register 25 and lower limit register 30. The range comparison logic 35 includes the appropriate logic circuitry to identify if the address being transmitted on the bus 20 is greater than or equal to the input A from the lower limit register 30, while also being less than or equal to the input B from the upper limit register 25.

The upper 25 and lower limit 30 registers are programmable and, in a preferred embodiment, are loaded during system initialization using techniques known in the art. The upper limit register 25 is loaded with the highest address of the group address range associated with the group to which the particular bank belongs. Analogously, the lower limit register 30 is loaded with the lowest address. For example, referring to FIG. 2, the upper limit register 25 for each bank of group 0, i.e., banks 0–3, would be loaded with address (X–1), and the lower limit register 30 for each bank of group 0 would be loaded with address 0. As such, when a transaction is carried on the bus having an address falling within the address range of group 0, each of the four banks 0–3 recognizes the transaction as falling within the group address range of its group.

Given the identification of a group, a bank must be identified from among the banks that belong to that group. To this end, each bank is associated with a bank ID that is unique within the group. However, the bank ID need not be unique on a system basis. For example, the bank ID of physical bank 0 may equal 0, and the bank ID of physical bank 4 may equal 0, as well. There is no ambiguity because bank 0 belongs to group 0 and bank 4 belongs to group 1. Programmable bank ID register 45 is provided for holding the bank ID of that bank. Thus, referring to FIG. 2, the bank register 45 of bank 0 would be loaded with an ID=0, as would the bank register 45 of physical bank 4.

Bank resource logic 40 provides an ID number 41, given an address. This logic will be described in detail below. For now, suffice it to say that this logic implements the type of interleaving, or the interleaving algorithm, to be performed, e.g., low-order.

Bank comparison logic 50 receives an input from bank register 45 and also receives an ID number 41 from bank resource logic 40. Bank comparison logic 50 includes logic circuitry to detect if the bank ID provided by register 45 matches the ID number 41 from logic An AND gate 51 is provided to receive inputs from the range comparison logic 35 and the bank comparison logic 50. If both inputs are "true", the bank is selected. Functionally, this means that the address carried on bus 20 fell within the group address range defined by registers 25 and 30 and that the ID number 41 matched the bank ID programmed into bank register 45. Referring back to FIG. 2 and the discussion above, the bank comparison logic 50 of banks 0 and 4 could both detect a match and provide a "true" output, but only one of the two banks could also detect the address as falling within its address range. Thus, only one of the two banks will be selected.

B. Bank Resource Logic of First Embodiment

The bank resource logic 40 provides an ID number given an address. As such, it determines the type of interleaving, or the interleaving algorithm, that is performed, such as "low-order" interleaving.

Figure 5:
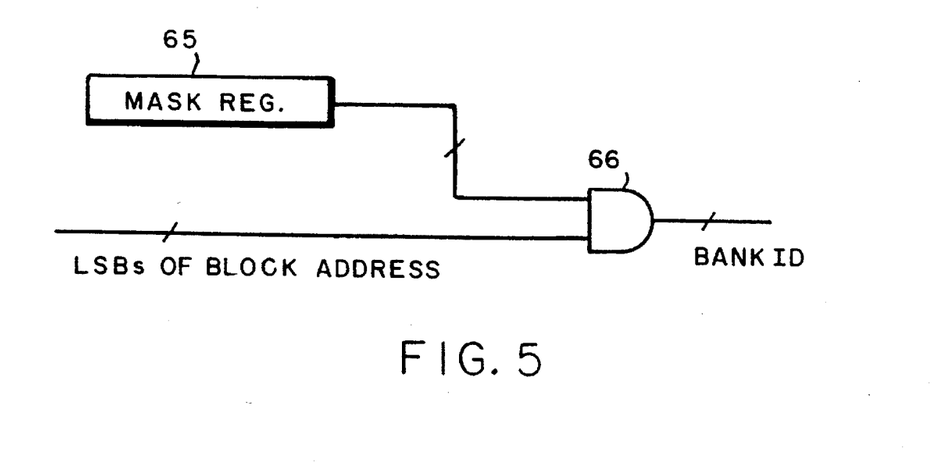
FIG. 5 is a logic diagram of a circuit for use with the first and second embodiments of the invention.

FIG. 5 illustrates an example of bank resource logic for implementing low-order interleaving. A programmable mask register 65 provides flexibility to the logic, as discussed below. An AND gate 66 receives an input from mask register 65 and the least significant bits ("LSBs") of the address. The number of LSBs received depends on the level of interleaving within a group that will be supported.

Figure 6:
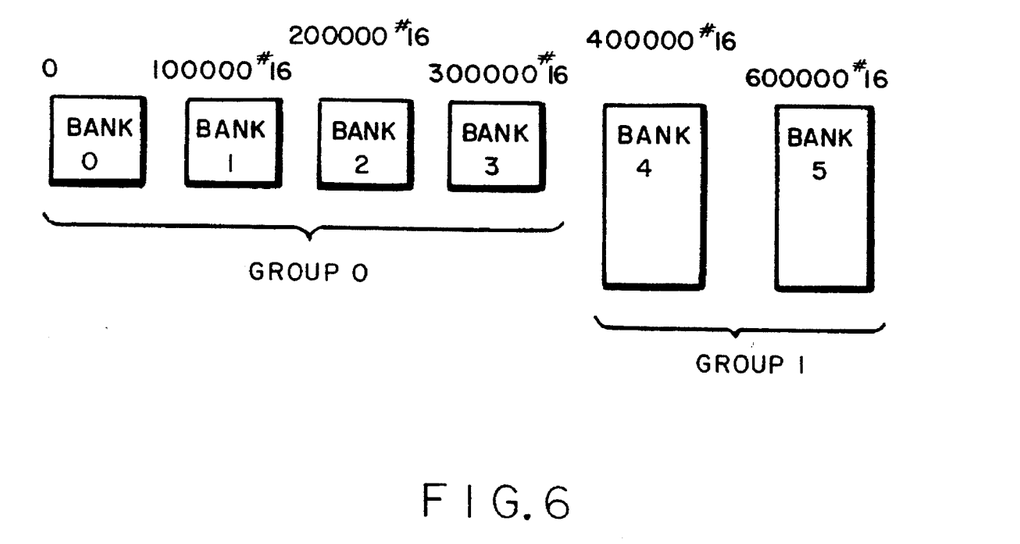
FIG. 6 is a second example of a memory organization according to the first embodiment of the invention.

The flexibility may be better understood with the following example. Referring to FIG. 6, within group 0, memory traffic will be 4-way interleaved among the four banks 0–3, and within group 1, memory traffic will be 2-way interleaved among the two banks 4–5. The banks 0–3 will have their bank ID registers 45 loaded with 0–3, respectively, and the banks 4–5 will have their bank ID registers 45 loaded with 0–1, respectively. Group 0 needs the two LSBs to interleave among the four banks of the group, and group 1 needs the LSB to do the same. Consequently, each bank of group 0 will have 00011#2 stored in its mask register 65, and each bank of group 1 will have 00001#2 stored in its mask register 65, assuming that 32-way interleaving is supported, thus, requiring five LSBs (the notation "# 2" refers to binary representation or base 2; "#8" refers to octal or base 8; #10 refers to decimal of base 10; and "#16" refers to hexadecimal or base 16).

Other interleaving algorithms may be used. For example, it is possible to implement pseudo-random interleaving in which, rather than using the LSBs to select a bank, a pseudo-random function is used. Pseudo-random functions are repeatable. That is, for a given address the function will always yield the same bank ID. This is necessary so that data which is written to an address X may be later read at address X. Pseudo-random interleaving, among other things, is less susceptible to performance degradation from certain patterns of memory traffic, particularly patterns of fixed stride.

In the present invention, one embodiment uses a pseudo-random approach, which will be called "residue interleaving." A memory address ("A") may be thought of in the following form:

$$A=V*P+R$$

where "V" is an integer (i.e., a polynomial); "P" is an irreducible polynomial; and "R" is a residue. "R", according to this formula, is the bank into which "A" should map, i.e., the ID number. In the mathematics of Galois Fields, numbers are represented as polynominals, see, e.g., John B. Fraleigh, First Course in Abstract Algebra 403–407 (1982). For example, the number 19#10, or 10011#2, is expressed as polynomial $$X^4+X+1(1=X^0)$$

It can be mathematically shown that "R", when described in this field of math, may be expressed as $$R=R_{n-1} \ldots R_1+R_o$$

where n equals the number of address lines covering the corresponding address range. Each $R_i$ may be precomputed as follows:

$$R_i(X)=X^i \bmod P(X)$$

Because the $R_i$ values may be precomputed, the residue "R", or ID number, may be determined by adding all the "true" address bits of "A". For the example above, "A" equals $X^4+X+1$ (or $X^o$). As such, $R_4$, $R_1$, and $R_0$ would be added modulo-2 to form the ID number. Because the addition is modulo-2, XOR gates may be used and there is no "carrying" or "rippling" of bits. Consequently, the operation may be performed more quickly than that of conventional binary addition.

Figure 9:
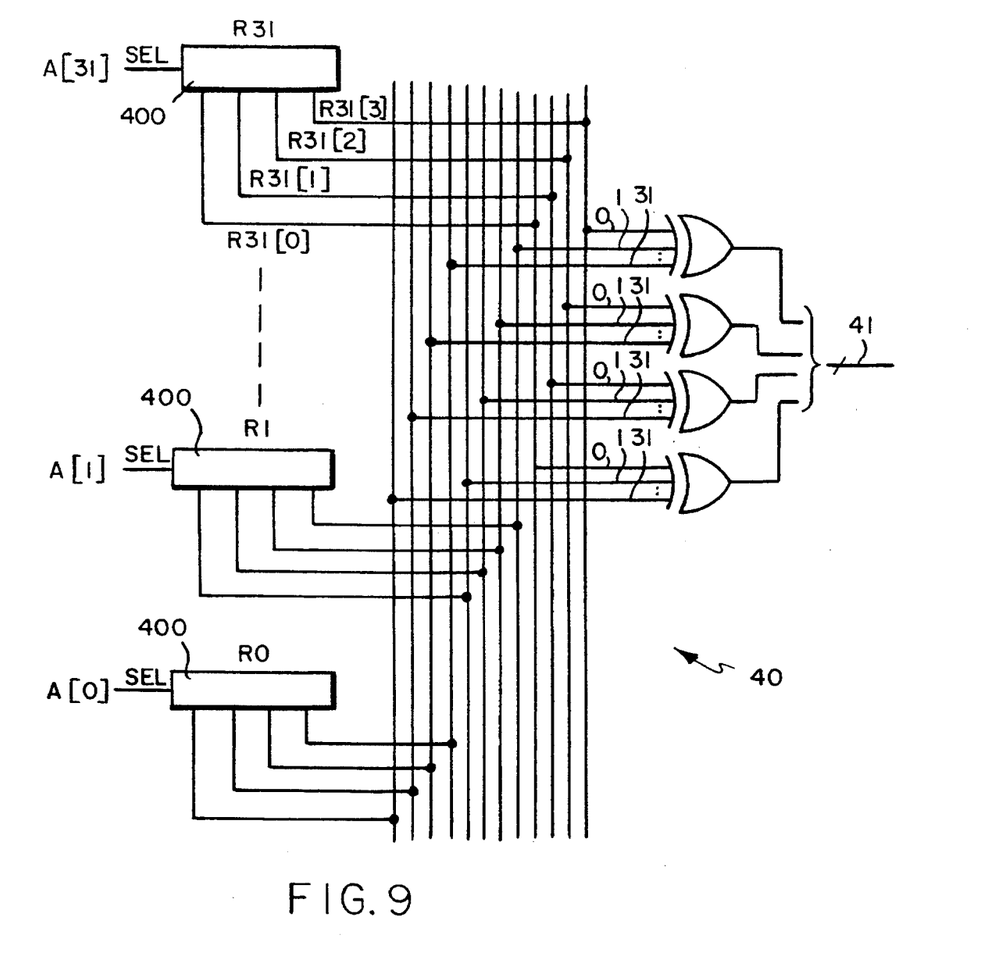
FIG. 9 is logic diagram of a circuit for use with the first and second embodiments of the invention.
Figure 9A:
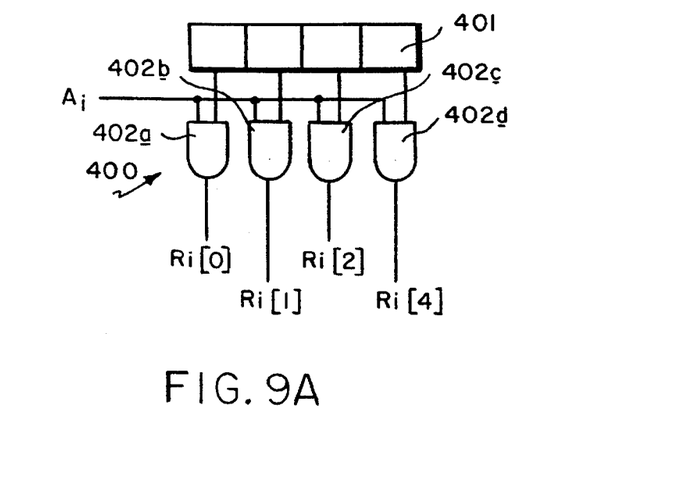
FIG. 9A is a logic diagram of a register/select unit.

Bank resource logic 40 (FIG. 2A) according to this embodiment, may be implemented with the circuit of FIG. 9, which is an exemplary circuit for a system having 32 address lines and up to 16 banks per group. Each register/select unit 400 (see FIG. 9A) has a register 401 that is loaded during system initialization. As described above, the $R_i$ values for all 32 lines may be precomputed. The AND gates 402*a*–*d* select the value loaded in register 401 only if the corresponding address line $A_i$ is "true". In the example above, $A_4$, $A_1$, and $A_0$ are true. The output from each register/select unit 400 is then received by a corresponding 32 bit wide XOR gate to perform the modulo-2 addition.

The bank resource logic 40 may be shared by all the banks of the group. That is, the circuits of FIGS. 5 or 9 need not be repeated for each memory bank. In addition, there is no limitation concerning the mixing of interleaving algorithms. One group may use low-order interleaving, and a second group may use residue interleaving. Lastly, the circuit of FIG. 9 may be loaded with appropriate values to implement low-order interleaving, if low-order interleaving is desired. In particular, $R_0$ would be loaded with 1#2; $R_1$ would be loaded with 10#2; $R_2$ would be loaded with 100#2; and $R_3$ would be loaded with 1000#2.

C. Bank Offset of First Embodiment

Accessing a block requires bank selection and a bank offset within the selected bank. In this embodiment, forming a bank offset is straightforward. For example, with M-way, low-order interleaving in a group, the log (M) LSBs are used to provide an ID number. The next most significant bits of the address are used as an offset for the banks of that group.

The actual number of offset bits depends upon the bank size. For example, if the bank size is 1M blocks, (i.e., $2^{20}$ blocks) the twenty next most significant bits are used as an offset within the bank.

D. Flexibility of First Embodiment

The actual size of the various registers, gates, and buses depends upon the underlying physical implementation of the system, particularly the amount of memory supported, the guaranteed minimum size of a bank, the maximum and minimum level of interleaving supported for a group, and the number of groups that will be supported. The respective sizes are straightforwardly determined given these architectural choices. For example if a bank is guaranteed to be at least 1M blocks, the range registers 25 and 30 and range comparison logic 35 need not be concerned with the 20 LSBs, because ranges, in this example, may be defined in 1M "chunks."

Moreover, those skilled in the art will appreciate that the system may be upgraded by adding the memory banks for the upgrade and programming the various registers accordingly.

2. Second Embodiment

A second preferred embodiment of the invention organizes a memory address range into an arbitrary number of segments. Each segment corresponds to a subrange of the address range. Within each segment, M-way interleaving is performed. A given bank, however, may belong to many segments and may belong to a plurality of discontiguous address ranges. Because an arbitrary number of segments may be used and because banks may belong to more than one segment, the memory address range can map into an arbitrary number of memory banks.

Figure 3:
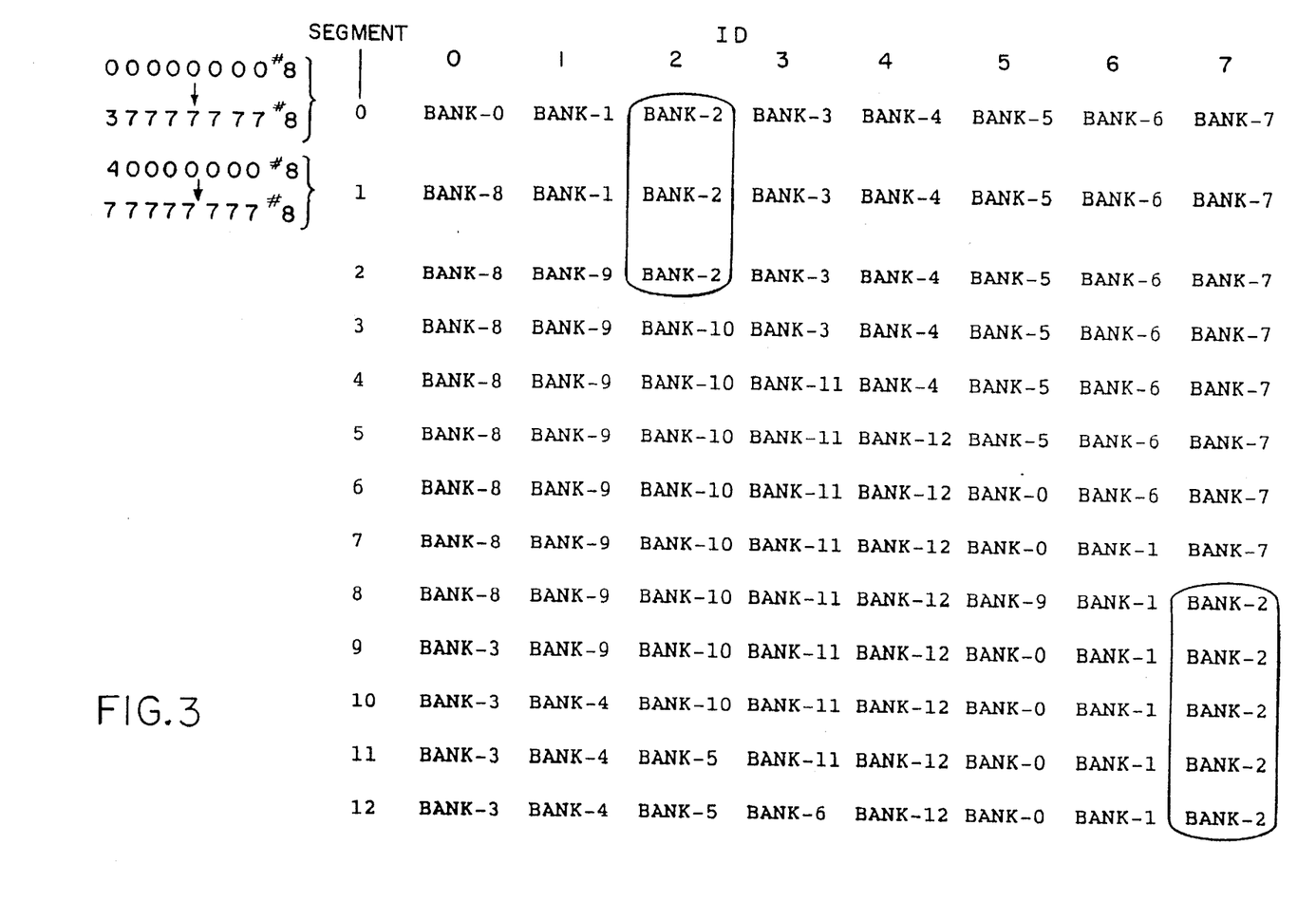
FIG. 3 is an example of a mapping of physical memory banks to memory address ranges, defined by segments, according to second embodiment of the invention.

FIG. 3 illustrates an example of a memory organization for this embodiment. Thirteen segments map into the address range. Each segment, in turn, is 8-way interleaved. A given bank, e.g., physical bank 2, may be associated with numerous segments, e.g., segments 0–2 and 8–12, and with multiple contiguous address ranges, which are discontiguous with respect to each other. For descriptive convenience, the contiguous address ranges are called "primary" and "secondary". For example, referring to physical bank 2, segments 0–2 are a primary range, and segments 8–12 are a secondary range. As will be further described below, a given physical bank, e.g., physical bank 2, may have multiple bank IDs. The bank IDs depend on whether a primary or secondary range is involved. For example, physical bank 2 has a bank ID of 0 in the primary range and a bank ID of 7 in the secondary range.

The example shown in the chart of FIG. 3 is for illustrative purposes only. Other variations of N segments and M-way interleaving may be devised. The critical features of the organization are that each of the N segments is associated with a set of M unique physical banks. In addition, there are N physical banks and each bank appears exactly M times in the chart. As will be clear from the description below, the actual organization will dictate how the various programmable registers are loaded.

A. Bank Selection of Second Embodiment

Figure 4:
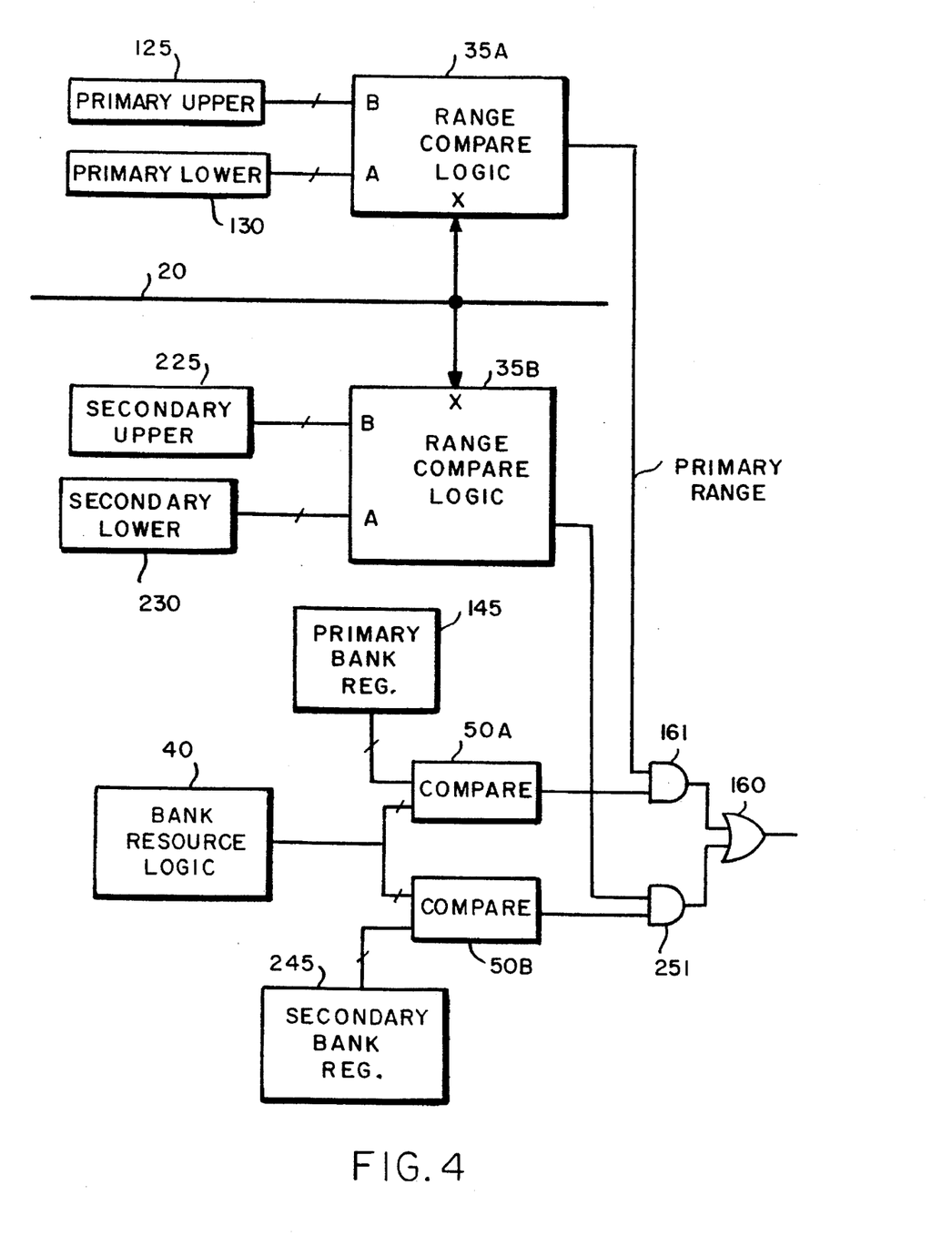
FIG. 4 is a logic diagram of a circuit for the second embodiment of the invention.

FIG. 4 illustrates an implementation of the bank selection logic. As described above, a bank may be associated with a primary and a secondary address range. As such, two sets of range defining registers are provided. Programmable registers 125 and 130 define the so-called primary range, and programmable registers 225 and 230 define the so-called secondary range. In the example above for physical bank 2, registers 125 and 130 will be loaded with values corresponding to the contiguous address range defined by segments 0–2, and registers 225 and 230 will be loaded with values corresponding to the contiguous address range defined by segments 8–12. As readily seen, in this example, the primary range is discontiguous with respect to the secondary range.

Range comparison logic 35A and 35B, similar to that of the first embodiment, receives an address from the bus 20 and inputs B and A from the range defining registers. Each logic 35A and 35B detects whether the bus address 20 falls within the corresponding range.

Bank resource logic 40 provides an ID number and implements the type of interleaving to be performed, as described above.

A given bank may have two bank IDs, as shown in FIG. 3, referring to physical bank 2, for example. Programmable bank ID registers 145 and 245 are loaded with the appropriate bank IDS, which depend upon the range. For example, bank 2 would have primary bank ID register 145 loaded with a 2, and would have secondary bank ID register 245 loaded with a 7.

Logic gates 161, 251, and 160 are provided to select the bank if the address carried on the bus 20 falls within the primary address range of that bank as defined by registers 125 and 130 and if the ID number matches the bank ID for the primary range as defined by the register 145 of that bank. Likewise, it selects the bank if the same has been detected with respect to the secondary range.

B. Bank Resource Logic of Second Embodiment

Similarly to that discussed above, the bank resource logic 40 provides an ID number given an address. As such, logic 40 determines the type of interleaving that is performed, such as "low-order" interleaving.

The above discussion for Bank Resource logic of First Embodiment applies here, as well, the only difference being that references to "group" should be replaced with references to "segment."

C. Bank Offset of Second Embodiment

Due to the organizational nature of the second embodiment, a bank offset cannot be formed from the more significant bits alone. To better illustrate this point, refer to FIG. 3, particularly the circled portions which indicate the address ranges for physical bank 2. In addition, assume that each segment corresponds to 8M blocks and that low-order interleaving is used with each bank having 1M blocks. Address 0#8 maps to segment 0, ID=0; address 1#8 maps to segment 0, ID=1; address 2#8 maps to segment 0, ID=2, etc. Moreover, every address with a stride of 8 relative to address 2#8 through this segment maps to ID=2. If more significant bits were used as an offset, address 2#8 would have offset=0; address 12#8 would have offset=1, address 22#8 would have offset=2, etc.

Now referring to segment 1, address 4000 0000#8 maps to ID=0; 4000 0001#8 maps to ID=1; and address 4000 0002#8 maps to ID=2. If more significant bits alone were used to form an offset, i.e., the 20 next most significant bits relative to the 3 LSBs used to select a bank, both address 2#8 and address 4000 0002#8 would provide an offset=0. That is, there would be no one-to-one mapping of memory addresses to bank locations, if an offset were formed in the fashion of the first embodiment.

Consequently, a logic circuit is included to prevent such ambiguity of offsets. In particular, the circuit provides an offset that is not only formed from the address, but ensures that the offset is a function of the segment number. As such, unique offsets can be ensured for unique addresses.

To better illustrate this point, referring to FIG. 3, bank 2 belongs to eight different segments, as does every other physical bank. As such, ⅛ of the bank's size must be dedicated to a given segment. By forming an offset which has 3 bits thereof being an output of a function of the segment number, the correct appropriation may be ensured. Consequently, each segment will have ⅛ of the bank storage allocated to it, and the offsets will be unique.

The three bits referred to above are called "replacement bits". In a preferred embodiment the replacement bits are used in forming the LSBs of the offset. These replacement bits, however, may be placed in any bit positions of the offset and still provide the correct allocation of storage and provide uniqueness of offset. As such, every address within segment 0 that maps to ID=2 will have the identical 3 LSBs of an offset into physical bank 2. Analogously, every address within segment 1 that maps into ID=2 will have the identical 3 LSBs of offset, which will be different than the 3LSBs of segment 0's offset.

Certain technologies may benefit by placing the replacement bits in certain bit positions. For example, in DRAMs, the row address lines are typically a speed critical path. As such, a DRAM configuration would likely position the replacement bits such that those offset bits are not used in forming the row address of the DRAM. This is so because the replacement operation necessarily adds delay to the formation of these offset bits, and delay is undesirable in a speed critical path.

Figure 7:
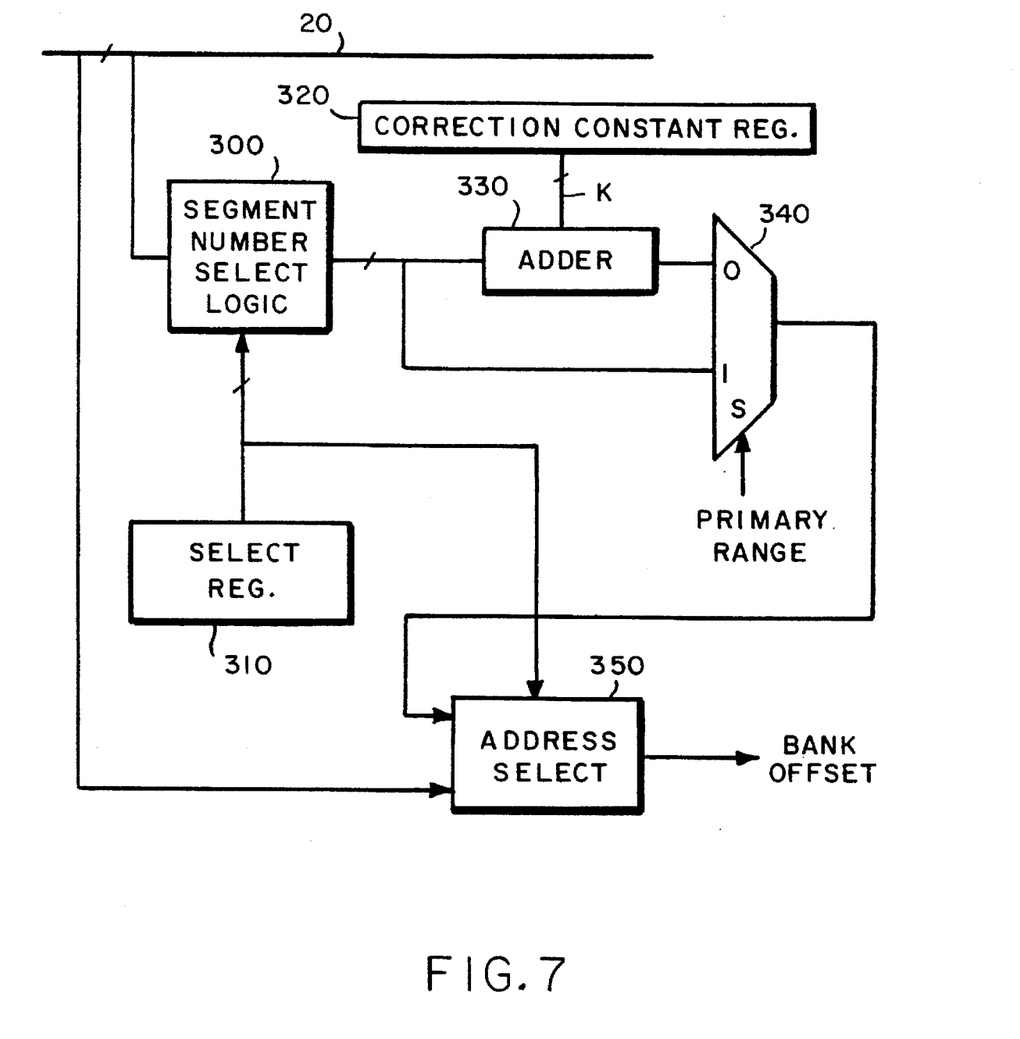
FIG. 7 is a logic diagram for a circuit for the second embodiment of the invention.

A preferred embodiment uses the offset forming circuit of FIG. 7. Segment number select logic 300 receives a subset of the address bits from bus 20. The subset corresponds to those bits of the address that distinguish among the segments ("segment number"). For example, referring to FIG. 3, address bit lines 23–26 would distinguish among the segments (bit 0 being the LSB). A programmable select register 310 provides flexibility, by indicating exactly which bits of the subset should be used. In the example of FIG. 3, select register 310 would indicate that the 3 LSBs of the segment number are needed, because the segments are partitioned according to eight banks. The selected bits are received by an adder 330, which also receives a correction constant K from programmable correction constant register 320. The output of the adder 330 and the selected bits of the segment number are received by mux 340, which selects among the inputs in response to signal "primary range," provided by range comparison logic 35A of FIG. 4. Consequently, the mux 340 outputs the 3 LSBs of the segment number, if the primary range is involved, and mux 340 outputs the 3 LSBs of the segment number plus K, otherwise.

Address selection logic 350 receives the output of mux 340 (i.e., the replacement bits) and the next most significant address bits from bus 20. Logic 350 then selects the appropriate number of offset bits in response to programmable selection register 310. That is, in the above example, register 310 indicates that there are 3 replacement bits that should be used as the LSBs of the offset. The next most significant bits of the address are then used as the next most significant bits of the offset.

By appropriate programming of the correction constant register 320, ambiguity is avoided. A correction constant K may be used that equals the next larger power of 2 higher than the level of interleaving, minus the number of segments. Because there is 8-way interleaving and 13 segments, a correction constant of 3 (16–13) avoids ambiguity.

Figure 8:
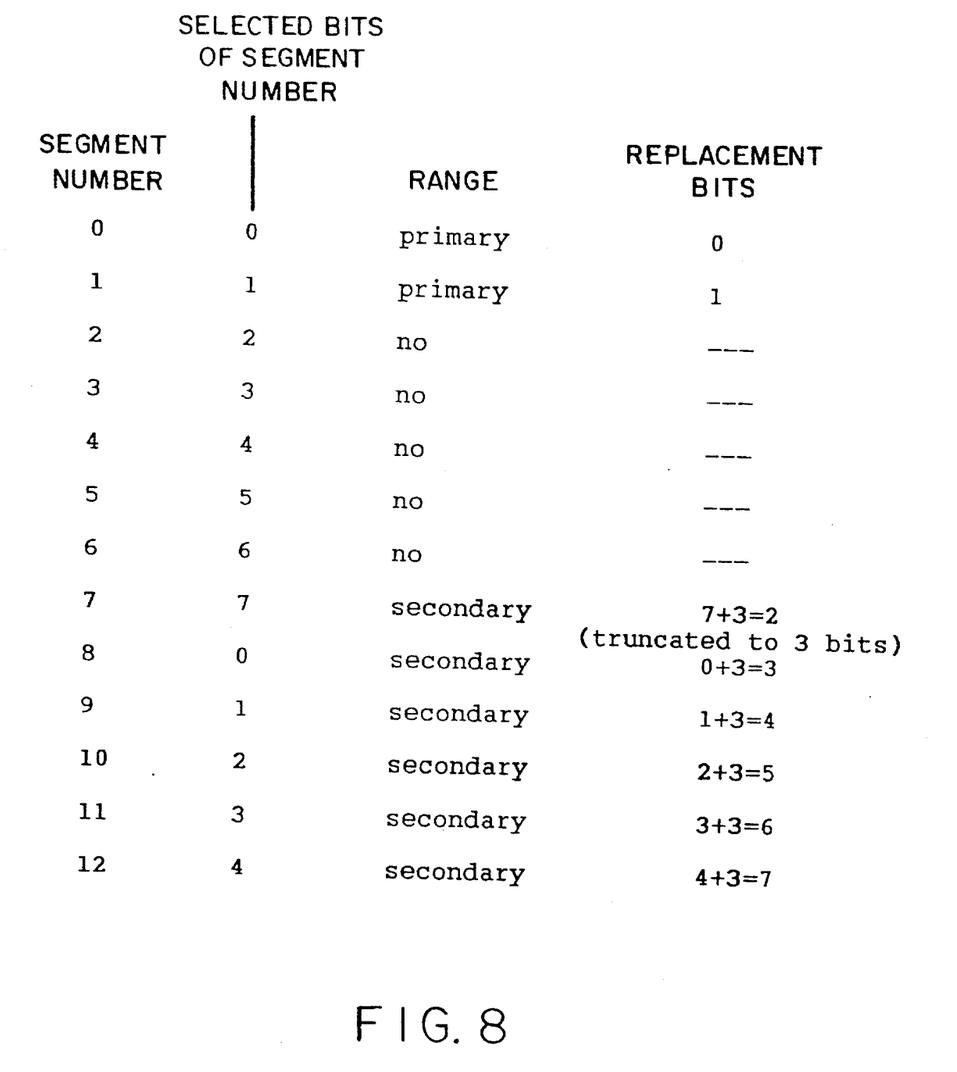
FIG. 8 illustrates an example of output from the circuit of FIG. 7.

FIG. 8 illustrates an example of the output the circuit of FIG. 9, with reference to physical bank 1. Physical bank 1 has a primary range corresponding to segments 0 and 1, and has a secondary range corresponding to segments 7 through 12. The correction constant K equals 3, as described above. As readily seen, the replacement bits are unique for each segment. As such, a unique offset may be formed by replacing the 3 LSBs of address with the replacement bits. The 17 next most significant address bits, relative to the 3 LSBs that are replaced, are then used as the 17 most significant bits of the offset.

Other bank offset functions may be utilized. The basic criteria is that each bank stores data from different segments at different bank offsets. One way to implement this is to use the segment number as an input to a logic circuit that implements a function that produces unique outputs given a unique input. FIG. 7 is one such example of a logic circuit using a segment number as the input.

D. Flexibility of Second Embodiment

The actual size of the various registers, gates, and buses depends upon the underlying physical implementation of the system, particularly the amount of memory supported, the guaranteed minimum size of a bank, the maximum and minimum level of interleaving supported for a segment, and the number of segments that will be supported. The respective sizes are straightforwardly determined given the architectural choices.

Moreover, those skilled in the art will appreciate that the system may be upgraded by adding the memory banks for the upgrade and programming the registers accordingly.

3. Third Embodiment

The first and second embodiments may be combined to form a third embodiment. In particular, the entire discussion of the second embodiment refers to mapping "an address range" into segments. As such, the memory address range of a memory system may be first partitioned into groups, and then within the group address range further subdivided into segment address ranges. This allows interleaving within a group according to the second embodiment. The advantage of this organization is that each group can interleave among an arbitrary number of banks as described in the second embodiment. In addition, a first group may use banks of one size, while a second group may use banks of another size. Thus, interleaving is possible among an arbitrary number of banks, and the banks in the memory system need not be equally sized.

Having thus described particular embodiments of the invention, various alterations, modifications, and improvements will readily occur to those skilled in the art. Such alterations, modifications, and improvements are intended to be part of this disclosure, and are intended to be within the spirit and scope of the invention. For example, the above-described invention may be used in cache systems as well as memory systems.

Accordingly, the foregoing description is by way of example only and is limited only as defined in the following claims and the equivalents thereto.

What is claimed is:

1. A method of interleaving a memory transaction into memory banks, the method comprising the steps of:
    a) partitioning a memory address range into a plurality of segments, each segment having a segment address range of contiguous address;
    b) associating each memory bank of the memory banks with a primary address range and a secondary address range, the primary and secondary address ranges each being contiguous;
    e) associating each memory bank with a primary bank ID corresponding to the primary address range;
    f) associating each memory bank with a secondary bank ID corresponding to the secondary address range;
    g) detecting whether a memory address of the memory transaction falls within the primary address range;
    h) detecting whether a memory address of the memory transaction falls within the secondary address range;
    i) processing the memory address of the memory transaction according to an interleaving algorithm to produce an ID number;
    j) detecting if the ID number matches the primary bank ID;
    k) detecting if the ID number matches the secondary bank ID;
    l) selecting a memory bank to receive the memory transaction if step (g) and step (j) detect the memory address as within the primary address range and the ID number as matching the primary bank ID;
    m) selecting a memory bank to receive the memory transaction if step (h) and step (k) detect the memory address as within the secondary address range and the ID number as matching the secondary bank ID; and
    n) producing a unique bank offset for the selected bank from the memory address, whereby a bank is selected and an offset is produced to map to the memory address.

2. The method of claim 1 wherein step (n) produces the unique bank offset by replacing memory address bits with replacement bits that are formed from a function having a segment number of the memory address as an input to the function.

3. The method of claim 1 wherein the function provides the memory address bits as the replacement bits, if the primary address range is detected, and wherein, if the secondary address range is detected, the replacement bits are produced by adding a correction constant to the memory address bits.

4. A memory interleaving logic circuit for a memory bank, comprising:
    range detection means for comparing a memory address of a memory transaction with a first upper range address and a first lower range address and for comparing the memory address with a second upper range address and a second lower range address, the first upper range address and first lower range address defining a primary address range, and the second upper range address and the second lower range address defining a secondary address range;
    ID means for producing an ID number from the memory address, according to an interleaving algorithm;
    bank ID comparison means for comparing the ID number with a first bank ID of the memory bank and with a second bank ID of the memory bank;

first means for selecting the bank to receive the memory transaction in response to the range detection means determining that the memory address falls within the primary address range and the bank ID comparison means determining that the first bank ID matches the ID number;

second means for selecting the bank to receive the memory transaction in response to the range detection means determining that the memory address falls within the secondary address range and the bank ID comparison means determining that the second bank ID matches the ID number.

5. The circuit of claim 4 further comprising means for forming a unique bank offset from the memory address.

6. The circuit of claim 5 wherein the means for forming includes:

segment number selection means for selecting a plurality of bits of the memory address as a segment number;

an adder, receiving the segment number as a first input and receiving a correction constant as a second input, the adder providing an output that is the sum of the first and second inputs;

first selection means for selecting between the segment number and an output of the adder in response to the range detection means; and second selection means for, receiving an output from the first selection means, for providing the bank offset.

7. The circuit of claim 6 wherein the interleaving algorithm of the ID means is a residue interleaving algorithm.

8. A system, comprising:

a computing circuit;

a memory bank communicating with the computing circuit by memory transactions having a memory address, the memory bank including a logic circuit comprising:

range detection means for comparing a memory address of a memory transaction with a first upper range address and a first lower range address and for comparing the memory address with a second upper range address and a second lower range address, the first upper range address and first lower range address defining a primary address range, and the second upper range address and the second lower range address defining a secondary address range;

ID means for producing an ID number from the memory address, according to an interleaving algorithm;

bank ID comparison means for comparing the ID number with a first bank ID of the memory bank and with a second bank ID of the memory bank;

first means for selecting the bank to receive the memory transaction in response to the range detection means determining that the memory address falls within the primary address range and the bank ID comparison means determining that the first bank ID matches the ID number; and second means for selecting the bank to receive the memory transaction in response to the range detection means determining that the memory address falls within the secondary address range and the bank ID comparison means determining that the second bank ID matches the ID number.

* * * * *